Jan. 21, 1969  G. E. GONSALVES ET AL  3,423,113
CONNECTOR FOR TUBULAR MEMBERS
Filed Jan. 10, 1966  Sheet 1 of 2
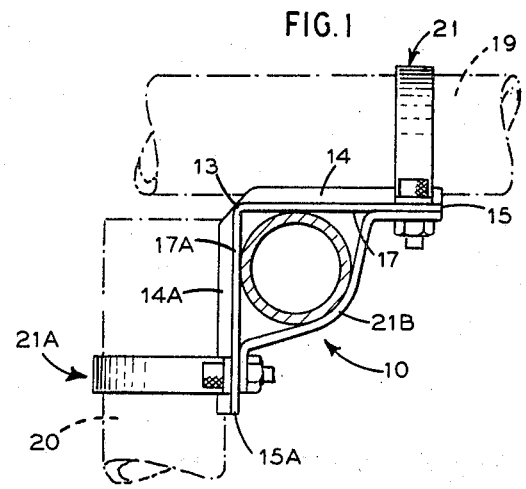
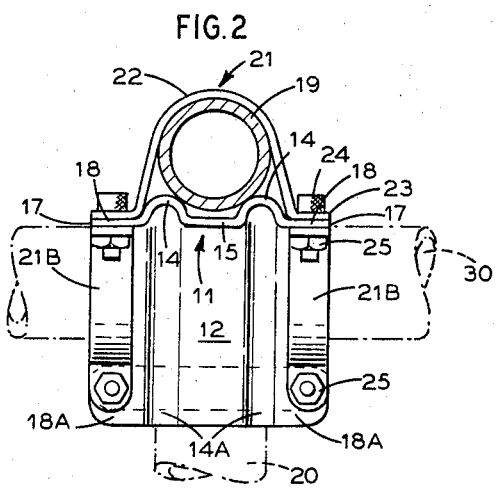
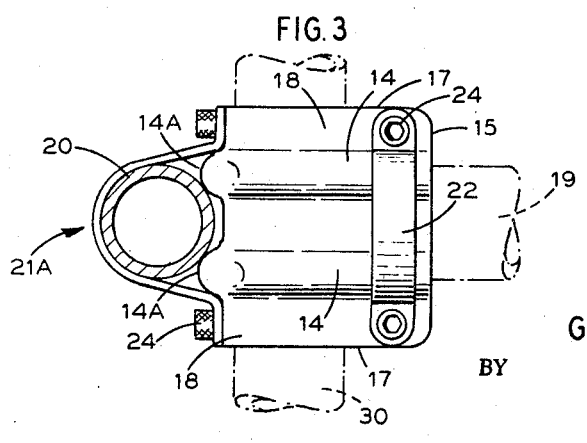
INVENTORS
George E. Gonsalves
Felice Dosso
BY
ATTORNEY

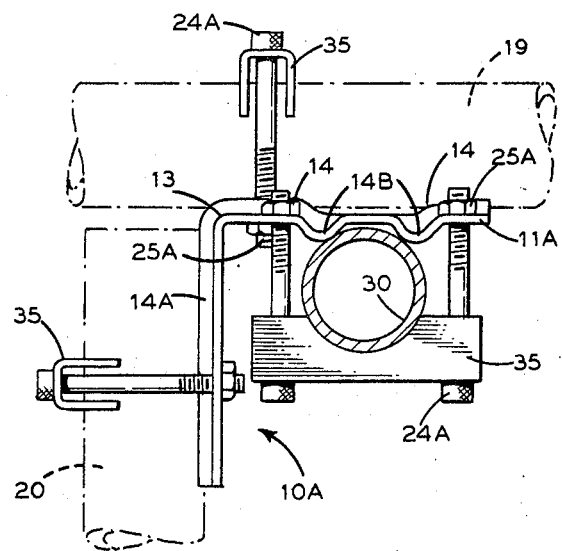
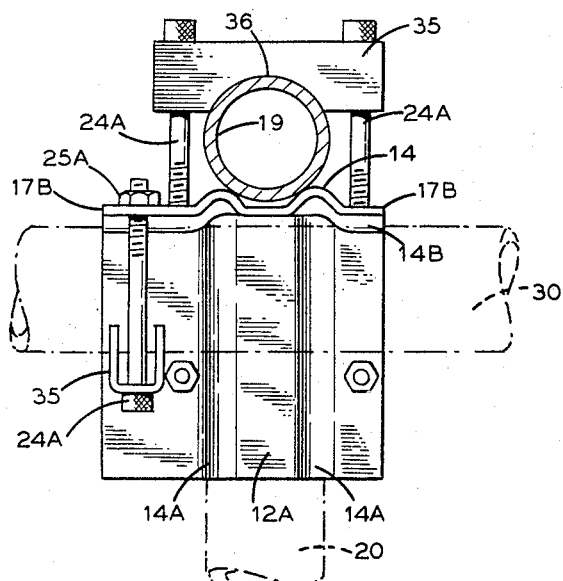

United States Patent Office 3,423,113
Patented Jan. 21, 1969

3,423,113
CONNECTOR FOR TUBULAR MEMBERS
George E. Gonsalves and Felice Dosso, Brooklyn, N.Y.,
assignors to Erie Packaging Corp., Brooklyn, N.Y., a
corporation of New York
Filed Jan. 10, 1966, Ser. No. 519,640
U.S. Cl. 287—51   1 Claim
Int. Cl. F16b 7/04; E04c 5/16; A44b 21/00

ABSTRACT OF THE DISCLOSURE

Angular connector means for interconnecting tubular members and other elongated members; the connector means being formed of thin sheet metal having hollow rib portions for reinforcing the connector means and further providing means for locating and cradling the tubular members in clamped relation thereto.

---

An object of this invention is to provide an improved connector device for coupling together two or more tubular members extending at an angle to each other; the device being formed of sheet metal of minimal thickness and including reinforcing means for imparting substantial stiffness to the device; the reinforcing means being further effective to provide a clamping element for securing the tubular members to the device.

Another object of this invention is to provide an improved connector of the character described, which is formed of a metal stamping having pressed rib portions integral therewith for rigidifying the connector and increasing its tensile and compressive values; said rib portions being adapted to cradle and engage the tubular members held in clamped relation thereto.

Still another object of this invention is to provide an improved connector of the character described, which is light in weight yet has high resistance to imposed stresses and strains; which is adapted to facilitate the clamping of interconnected members thereto; and which is economical to manufacture.

Other objects of this invention will in part be obvious and in part hereinafter pointed out.

In the drawing, FIG. 1 is a side elevational view showing one embodiment of a connector embodying the invention, in coupling relation to three elongated members extending at right angles to each other;

FIG. 2 is an end elevational view thereof;

FIG. 3 is a top plan view thereof;

FIG. 4 is a view similar to that of FIG. 1, showing another embodiment of the invention;

FIG. 5 is an end elevational view thereof.

Essentially, the connector of the instant invention comprises a sheet metal angle bracket member having a pair of arms at right angles to each other; the same being made as a metal stamping, wherein the arms are reinforced by ribs formed integrally therein; the ribs further serving to cradle elongated members which are to be coupled by the connector and to coact with clamping means securing the elongated members to the connector.

As shown in FIGS. 1–3, 10 designates one form of connector embodying the invention, for coupling or interconnecting two or three elongated members which may take the form of pipes, tubing or solid rod. For the purpose of illustration, a showing is made in respect to piping to provide two or three dimensional structures.

Connector body 10 is in the form of a metal stamping fashioned from an initially flat metal sheet and having a right angle shape and including a pair of substantially flat arms 11, 12 of more or less equal length which form an apex juncture at 13. The arm 11 has pressed out of the plane thereof, a pair of parallel rib portions 14 which project from the outer surface of said arm and extend from the outer end edge 15 thereof to the juncture 13. Rib portions 14 are from one another and spaced inwardly from the side edges 17 thereof approximately the same distance and thus divide the arm surface from which they extend into three parts or zones of substantially equal width, of which the outermost parts provide lateral flange portions 18.

Similarly, arm 12 is formed with a pair of rib portions 14A which project from the outer surface thereof and extend from the end edge 15A to the juncture 13 and are respectively aligned with rib portions 14; thus providing lateral flange portions 18A at side edges 17A.

The rib portions 14, 14A are hollow and of a U-shaped cross section. The rib portions provide stiffening for the arm portions 11, 12; allowing the same to be of minimal thickness yet having substantial resistance to incidental stresses and strains.

The invention also provides means for mounting and clamping piping members 19, 20 to the arms 11, 12 so as positively to locate the same at right angles to each other. Thus, member 19 is held against rib portions 14 on arm 11 so as to make only line contact therewith by a cross strap member 21 having a U-shaped intermediate portion 22 encircling the major portion of the circumferential extent of member 19, and outwardly projecting attaching ear portions 23 at the opposite ends of intermediate portion 22.

The ear portions 23 of cross strap member 21 overlie the flange portions 18 of arm 11 adjacent end 15 thereof and screws 24 passing through registering, transversely related openings in said ear and flange portions 23, 18, together with nuts 25 on said screws serves to secure piping member 19 tightly against rib portions 14.

Similarly, piping member 20 is secured against rib portions 14A on arm by a cross strap member 21A, screws 24 and nuts 25; strap member 21A being located adjacent end edge 15A of arm 12. A third piping member 30 may be mounted on connector 10 in right angle relationship to members 19, 20; to form a three dimensional structure of said piping members 19, 20 and 30. In this case, a pair of strap members 21B, similar to members 21, 21A, but arranged longitudinally of the connector body 10, encircle piping member 30 which is disposed in the included angle within the apex portion 13 of connector 10, and the attaching ear portions 23B thereof which are disposed to overlie the flange portions 18, 18A of arm portions 11, 12 are secured by the same screws 24 and nuts 25 which secure the aforesaid cross strap members 21, 21a.

The spacing between parallel rib portions 14; 14A is adjusted to the size of piping members 19, 20 coupled by connector 10 so as to insure that said members make line contact only with said rib portions. Such spacing of the rib portions is such as to subtend an angular displacement measured on members 19, 20 between the points of contact of said rib portions in respect to the circumferential extent thereof, of the order of about 80° although such angular displacement may range from about 50° to about 110°.

It has been found that the rib portions 14, 14A not only stiffen the arms portions 11, 12 of connector 10; but also cooperate with the strap members 21, 21A to effectively maintain the piping members 19, 20 clamped to said connector against any substantial lateral movement about said strap members as a pivot. It is understood that rib portions 14, 14A may have varying cross sections to suit the desired reinforcing and clamping characteristics thereof.

In FIGS. 4, 5 there is shown another embodiment of the invention. Here connector 10A comprises arms 11A, 12A, similar to arms 11, 12, except that the width of said arms between side edges 17B thereof, is somewhat greater. Arms 11A, 12A are formed with rib portions 14, 14A, as previously described to receiving piping members 19, 20, with clamp elements 35 of channel cross section having central arcuate cutout portions 36 to engage the outer circumferential portions of said piping members 19, 20. Screws 24A pass through openings at opposite ends of clamp elements 35 and thence through aligned openings in flange portion 18B, with nuts 25A to tightly clamp piping member 19 against the rib portions 14 on arm 11. Piping member 20 is similarly clamped to rib portions 14A on arm 12.

The third piping member 30 is clamped to the underside of arm 11A, in spaced relation to apex portions 13 of connector 10A. Arm 11A is formed with a second set of rib portions 14B which project from the underside thereof and are in right angle relation to rib portions 14. Thus, piping member 30 is seated on rib portions 14B and clamped thereto by a clamping element 35 as previously described. The spacing of rib portions 14B from apex 13 of the connector 10, together with the increased width of arm 11, provides for proper location of the clamp element 35 securing the third piping member 30 to arm 11.

While the connector 10 is particularly shown for coupling tubular members to form two and three dimensional frame structures, it is understood that such connector may also be used to interconnect solid rod members and the like. Also, the cross section of the interconnected members may be of a polygonal character approaching a circular cross section.

It will be apparent that connector member 10 may be formed of metal in gauges which lend themselves to stamping and die forming operations. Thus, the gauge of the metal may be minimized, with assurance that the rib portions thereof will make the same resistant to stresses and strains incident to the use thereof.

As various changes might be made in the embodiments of the invention herein disclosed without departing from the spirit thereof, it is understood that all matter herein shown or described shall be deemed illustrative and not by way of limitation except as set forth in the appended claims.

What is claimed is:

1. A connector for interconnecting a plurality of elongated pipe and like members comprising: an originally flat sheet of metal having two parallel ribs stamped therein, said sheet being bent at a right angle to form arms of substantially equal length, said ribs extending outwardly from the relatively outer face of each of said arms, said ribs dividing each arm into three parts of substantially equal width, at least one hole adjacent the outer extremity of each of the outermost of said three parts and said holes being transversely and longitudinally related, a substantially U-shaped sheet metal clamp adapted to be secured, by bolts extending through said holes in said arms which are transversely related, to each of said outer faces thereby to secure a pipe member thereon in line contact with each of said parallel ribs of each arm, and semi-cylindrical clamps adapted to be secured by said bolts extending through said holes which are longitudinally related thereby to secure a pipe member in the included angle formed by said arms, said pipe members when in clamped position being retained by said ribs against substantially any movement about said first-named clamps as a pivot.

References Cited

UNITED STATES PATENTS

| 1,802,015 | 4/1931 | Hays | 285—199 |
| 2,847,237 | 8/1958 | Ackerman | 287—54 |
| 3,046,040 | 7/1962 | Luper | 285—188 |
| 3,148,714 | 9/1964 | Hillier | 285—197 |

FOREIGN PATENTS 22,489   10/1947   Finland.

CARL W. TOMLIN, *Primary Examiner.*

WAYNE L. SHEDD, *Assistant Examiner.*

U.S. Cl. X.R.

52—719; 24—279; 248—68